US 8,612,359 B2

(12) United States Patent
Hull et al.

(10) Patent No.: US 8,612,359 B2
(45) Date of Patent: Dec. 17, 2013

(54) METHOD AND SYSTEM FOR SHARING PORTAL SUBSCRIBER INFORMATION IN AN ONLINE SOCIAL NETWORK

(75) Inventors: Mark E. Hull, San Jose, CA (US); Ellen S. Perelman, San Francisco, CA (US); F. Randall Farmer, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 5 days.

(21) Appl. No.: 10/866,954

(22) Filed: Jun. 14, 2004

(65) Prior Publication Data

US 2005/0171832 A1 Aug. 4, 2005

Related U.S. Application Data

(60) Provisional application No. 60/540,505, filed on Jan. 29, 2004, provisional application No. 60/544,639, filed on Feb. 13, 2004.

(51) Int. Cl.
*G06Q 10/00* (2012.01)

(52) U.S. Cl.
USPC ....................................................... 705/319

(58) Field of Classification Search
USPC .............................. 705/7, 10, 319
See application file for complete search history.

(56) References Cited

U.S. PATENT DOCUMENTS

| | | |
|---|---|---|
| 5,086,394 A | 2/1992 | Shapira |
| 5,681,046 A | 10/1997 | Lawrence |
| 5,835,087 A | 11/1998 | Herz et al. |
| 5,950,193 A | 9/1999 | Kulkarni |
| 5,950,200 A | 9/1999 | Sudai et al. |
| 5,963,951 A | 10/1999 | Collins |
| 5,996,006 A | 11/1999 | Speicher |
| 6,029,141 A | 2/2000 | Bezos et al. |
| 6,052,122 A | 4/2000 | Sutcliffe et al. |
| 6,061,681 A | 5/2000 | Collins |
| 6,064,967 A | 5/2000 | Speicher |
| 6,129,141 A | 10/2000 | Yang |

(Continued)

FOREIGN PATENT DOCUMENTS

| | | |
|---|---|---|
| CA | 2455342 | 6/2004 |
| JP | 2004-272423 | 9/2004 |

OTHER PUBLICATIONS

Cranor et al. Spam !, Communications of the ACM, vol. 41, No. 8, Aug. 1998, p. 74-83 [DIALOG: file 15].*

(Continued)

*Primary Examiner* — Jonathan G Sterrett
(74) *Attorney, Agent, or Firm* — James J. DeCarlo; Greenberg Traurig, LLP (57) ABSTRACT

A method, apparatus, and system are directed towards making a user's online portal information available to members of an online social network. Portal information can include information entered by the user and information determined based on the user's online behaviors, such as frequenting a Web site, sending spam messages, and the like. The online social network enables multiple degrees of relationships among members of the online social network. At least a portion of the portal information is made accessible to at least some of the members of the online social network who have a relationship to the user. The relationship can be through a public activity available to all members and/or through a user-defined category of members, such as family, friends, business contacts, and the like. The portal information can be used to determine which relationships will be established and/or which information will be available to members.

45 Claims, 5 Drawing Sheets

(56) References Cited

U.S. PATENT DOCUMENTS

| | | |
|---|---|---|
| 6,175,831 B1* | 1/2001 | Weinreich et al. .............. 707/10 |
| 6,243,375 B1 | 6/2001 | Speicher |
| 6,249,282 B1 | 6/2001 | Sutcliffe et al. |
| 6,269,369 B1 | 7/2001 | Robertson |
| 6,272,467 B1 | 8/2001 | Durand et al. |
| 6,282,515 B1 | 8/2001 | Speicher |
| 6,285,984 B1 | 9/2001 | Speicher |
| 6,296,369 B1 | 10/2001 | Liao |
| 6,324,541 B1 | 11/2001 | de l'Etraz et al. |
| 6,327,573 B1 | 12/2001 | Walker et al. |
| 6,356,879 B2 | 3/2002 | Aggarwal et al. |
| 6,433,795 B1 | 8/2002 | MacNaughton et al. |
| 6,449,344 B1 | 9/2002 | Goldfinger et al. |
| 6,466,917 B1 | 10/2002 | Goyal et al. |
| 6,473,751 B1 | 10/2002 | Nikolovska et al. |
| 6,502,077 B1 | 12/2002 | Speicher |
| 6,539,232 B2 | 3/2003 | Hendrey et al. |
| 6,542,748 B2 | 4/2003 | Hendrey et al. |
| 6,542,749 B2 | 4/2003 | Tanaka et al. |
| 6,542,750 B2 | 4/2003 | Hendrey et al. |
| 6,606,657 B1 | 8/2003 | Zilberstein et al. |
| 6,647,269 B2 | 11/2003 | Hendrey et al. |
| 6,665,389 B1 | 12/2003 | Haste, III |
| 6,681,247 B1 | 1/2004 | Payton |
| 6,697,786 B2 | 2/2004 | Speicher |
| 6,714,931 B1* | 3/2004 | Papierniak et al. ............ 707/10 |
| 6,735,568 B1 | 5/2004 | Buckwalter et al. |
| 6,745,178 B1 | 6/2004 | Emens et al. |
| 6,819,919 B1 | 11/2004 | Tanaka |
| 6,836,762 B2 | 12/2004 | Speicher |
| 6,879,994 B1 | 4/2005 | Matsliach et al. |
| 6,993,325 B1 | 1/2006 | Waesterlid |
| 7,069,308 B2 | 6/2006 | Abrams |
| 7,080,117 B2 | 7/2006 | de Pinto et al. |
| 7,117,254 B2 | 10/2006 | Lunt et al. |
| 7,143,052 B2 | 11/2006 | LaSalle et al. |
| 7,167,910 B2 | 1/2007 | Farnham et al. |
| 7,188,153 B2 | 3/2007 | Lunt et al. |
| 7,200,638 B2 | 4/2007 | Lake |
| 7,203,674 B2 | 4/2007 | Cohen |
| 7,290,285 B2 | 10/2007 | McCurdy et al. |
| 7,366,759 B2 | 4/2008 | Trevithick et al. |
| 7,454,357 B2 | 11/2008 | Buckwalter et al. |
| 7,512,653 B2 | 3/2009 | Krishnasamy et al. |
| 7,536,637 B1 | 5/2009 | Nauerz et al. |
| 7,558,759 B2 | 7/2009 | Valenzuela et al. |
| 7,592,910 B2 | 9/2009 | Tuck et al. |
| 7,613,706 B2 | 11/2009 | Terrill et al. |
| 7,613,769 B1 | 11/2009 | Hess |
| 7,676,466 B2 | 3/2010 | Terrill et al. |
| 7,788,260 B2 | 8/2010 | Lunt et al. |
| 7,813,741 B2 | 10/2010 | Hendrey et al. |
| 2001/0032245 A1 | 10/2001 | Fodor |
| 2002/0023132 A1* | 2/2002 | Tornabene et al. ........... 709/205 |
| 2002/0023230 A1 | 2/2002 | Bolnick et al. |
| 2002/0040310 A1 | 4/2002 | Lieben et al. |
| 2002/0049616 A1 | 4/2002 | Speicher |
| 2002/0059201 A1 | 5/2002 | Work |
| 2002/0099806 A1 | 7/2002 | Balsamo et al. |
| 2002/0099808 A1 | 7/2002 | Pisupati et al. |
| 2002/0103797 A1 | 8/2002 | Goel et al. |
| 2002/0107242 A1 | 8/2002 | Sabb et al. |
| 2002/0116458 A1 | 8/2002 | Bricklin et al. |
| 2002/0116466 A1 | 8/2002 | Trevithick et al. |
| 2002/0124053 A1 | 9/2002 | Adams et al. |
| 2002/0178163 A1 | 11/2002 | Mayer |
| 2003/0037114 A1 | 2/2003 | Nishio et al. |
| 2003/0050977 A1* | 3/2003 | Puthenkulam et al. ....... 709/204 |
| 2003/0074440 A1 | 4/2003 | Grabarnik et al. |
| 2003/0093405 A1 | 5/2003 | Mayer |
| 2003/0105827 A1 | 6/2003 | Tan et al. |
| 2003/0135412 A1 | 7/2003 | Speicher |
| 2003/0158855 A1 | 8/2003 | Farnham et al. |
| 2003/0167324 A1 | 9/2003 | Farnham et al. |
| 2003/0200217 A1 | 10/2003 | Ackerman |
| 2003/0220980 A1 | 11/2003 | Crane |
| 2003/0231207 A1 | 12/2003 | Huang |
| 2004/0010484 A1 | 1/2004 | Foulger et al. |
| 2004/0044536 A1 | 3/2004 | Fitzpatrick et al. |
| 2004/0048605 A1 | 3/2004 | Schaefer et al. |
| 2004/0088315 A1 | 5/2004 | Elder et al. |
| 2004/0088322 A1 | 5/2004 | Elder et al. |
| 2004/0088325 A1 | 5/2004 | Elder et al. |
| 2004/0103203 A1 | 5/2004 | Nichols et al. |
| 2004/0107242 A1 | 6/2004 | Vert et al. |
| 2004/0119760 A1 | 6/2004 | Grossman et al. |
| 2004/0122681 A1 | 6/2004 | Ruvolo et al. |
| 2004/0122803 A1 | 6/2004 | Dom et al. |
| 2004/0122810 A1 | 6/2004 | Mayer |
| 2004/0122855 A1 | 6/2004 | Ruvolo et al. |
| 2004/0133440 A1 | 7/2004 | Carolan et al. |
| 2004/0148275 A1 | 7/2004 | Achlioptas |
| 2004/0153514 A1 | 8/2004 | Crane |
| 2004/0167794 A1 | 8/2004 | Shostack et al. |
| 2004/0177120 A1 | 9/2004 | Kirsch |
| 2004/0199765 A1 | 10/2004 | Kohane et al. |
| 2004/0210661 A1 | 10/2004 | Thompson |
| 2004/0215648 A1 | 10/2004 | Marshall et al. |
| 2004/0215793 A1* | 10/2004 | Ryan et al. .................... 709/229 |
| 2004/0249811 A1 | 12/2004 | Shostack et al. |
| 2004/0260781 A1 | 12/2004 | Shostack et al. |
| 2004/0260792 A1 | 12/2004 | Speicher |
| 2005/0015432 A1* | 1/2005 | Cohen .......................... 709/201 |
| 2005/0015455 A1* | 1/2005 | Liu ............................... 709/207 |
| 2005/0021750 A1 | 1/2005 | Abrams |
| 2005/0076003 A1 | 4/2005 | DuBose et al. |
| 2005/0076021 A1 | 4/2005 | Wu et al. |
| 2005/0083906 A1 | 4/2005 | Speicher |
| 2005/0125408 A1 | 6/2005 | Somaroo et al. |
| 2005/0197846 A1 | 9/2005 | Pezaris |
| 2005/0209861 A1 | 9/2005 | Hewes et al. |
| 2005/0216300 A1 | 9/2005 | Appelman et al. |
| 2005/0235062 A1 | 10/2005 | Lunt et al. |
| 2006/0021009 A1 | 1/2006 | Lunt |
| 2006/0031121 A1 | 2/2006 | Speicher |
| 2006/0059130 A1 | 3/2006 | Weiss et al. |
| 2006/0059142 A1 | 3/2006 | Zvinyatskovsky et al. |
| 2006/0059159 A1 | 3/2006 | Truong et al. |
| 2006/0080121 A1 | 4/2006 | Chiang |
| 2006/0155566 A1 | 7/2006 | Berger |
| 2006/0218153 A1 | 9/2006 | Voon et al. |
| 2006/0242128 A1 | 10/2006 | Goel |
| 2007/0027921 A1 | 2/2007 | Alvarado et al. |
| 2007/0031800 A1 | 2/2007 | Solomon |
| 2007/0069901 A1 | 3/2007 | Tuck et al. |
| 2007/0073802 A1 | 3/2007 | Terrill et al. |
| 2008/0120277 A1 | 5/2008 | Pettinati et al. |
| 2008/0133716 A1 | 6/2008 | Rao et al. |

OTHER PUBLICATIONS

"Welcome to the Christian Connection Matchmaker" archive.org website of www.christian.matchmaker.com, Feb. 21, 1999.*

"The Purpose Principles and Process" archive.org website of www.christian.matchmaker.com, Feb. 24, 1999.*

"A Sneak Preview of the Christian Connection Matchmaker Search Page", archive.org website of www.christian.matchmaker.com, May 8, 1999.*

"A Sneak Preview of the Christian Connection Matchmaker Match Page", archive.org website of www.christian.matchmaker.com, Feb. 23, 1999.*

"Yahoo! Groups—What is a Group?" archive.org website of www.yahoo.com, Nov. 3, 2002.*

"Yahoo! Groups—Getting Started, Groups Account, Groups Features" archive.org website of www.yahoo.com, Oct. 31, 2002.*

"Yahoo! Groups—What is the spam policy of Yahoo! Groups? How do I avoid spam?" archive.org website of www.yahoo.com, Oct. 24, 2002.*

Merrick, Amy; "The Best Way to . . . Find a Date—OK, so true love isn't guaranteed; But there are ways to better the odds", Nov. 27, 2000, Wall Street Journal, New York, NY, p. R.16, ProQuest ID 64669169.*

(56) References Cited

OTHER PUBLICATIONS

Member site Selection Page for Matchmaker.com, web.archive.org webpage of Feb. 19, 1999, web.archive.org/web/19990219183131/matchmaker.com/newtry.shtml.*
Welcome to the Christian Connection Matchmaker, web.archive.org webpage of Feb. 22, 1999, web.archive.org/web/19990222170152/http://www.Christian.email.net/index.html.*
Matchmaker.com Disclaimer, web.archive.org webpage of Apr. 20, 2000, web.archive.org/web/20000420114350/www.Christian.matchmaker.com/rules.*
"System Names and Numbers", archive.org website of www.christian.matchmaker.com, Apr. 24, 1999.*
"Matchmaker User Tools Page" archive.org website of www.christian.matchmaker.com, Apr. 24, 1999, pp. 1-2.*
"Matchmaker Help—Block" archive.org website of www.christian.matchmaker.com, Sep. 10, 1999, p. 1.*
"Matchmaker Help—Main Page" archive.org website of www.christian.matchmaker.com, Oct. 4, 1999, p. 1-3.*
"Matchmaker Help—Frequently Asked Questions" archive.org website of www.christian.matchmaker.com, Sep. 10, 1999, p. 1-7.*
"Welcome to My Yahoo!" archive.org website of www.yahoo.com, Nov. 2, 2002, p. 1-2.*
"A Sneak Preview of the Christian Connection Matchmaker Who's On Page", archive.org website of www.christian.matchmaker.com, Feb. 24, 1999.*
Tiwana, Amrit; Bush, Ashley; "A Social Exchange Architecture for Distributed Web Communities", 2001, Journal of Knowledge Management, 5, 3, ABI/INFORM Global, p. 242-248.*
Moore, Kimberly A; Stearns, Maxwell L; "The Law and Economics of Survivor", (C) 2000, George Mason University School of Law, pp. 1-39.*
Matchmaker.com website Feb. 23, 1999, "A Sneak Preview of the The Christian Connection Matchmaker User Profile Page", pp. 1-5, retrieved from the web at: http://web.archive.org/web/19990223210921/www.christian.matchmaker.com/ppbrowse.*
Dragan, Richard V. *PC Magazine*. Jan. 20, 2004. Tribe.net(beta). 5pp. Available: http//:www.pcmag.com/article2/0,1759,1418688,00.asp.
FAQs. Nov. 5, 2003. "About the ZeroDegrees Service." 25pp. Available: http://www.zerodegrees.com/faq.htm.
*BusinessWeek* Online. Mar. 1, 2004. "Diller's Latest Little Bet on the Net." 2pp. Available: http//www.businessweek.com:/print/technology/content/mar2004/tc2004031_2820_tc119.h . . . .
Ethier, Jason. Dec. 10, 2003. "Current Research in Social Network Theory." 10pp. Available: http://upaya.soc.neu.edu/archive/students/Ethier-SocialNetworks.html.
International Preliminary Report on Patentability dated Dec. 14, 2006 issued for corresponding International Patent Application No. PCT/US2004/038703.
U.S. Appl. No. 10/832,172, Official Communication mailed May 16, 2007.
U.S. Appl. No. 10/832,172, Official Communication mailed Feb. 9, 2007.
U.S. Appl. No. 10/832,172, Official Communication mailed Aug. 23, 2006.
U.S. Appl. No. 10/946,636, Official Communication mailed Feb. 21, 2007.
U.S. Appl. No. 10/946,636, Official Communication mailed Aug. 29, 2006.
U.S. Appl. No. 10/946,630, Official Communication mailed Jul. 27, 2007.
U.S. Appl. No. 10/946,630, Official Communication mailed May 2, 2007.
U.S. Appl. No. 10/946,630, Official Communication mailed Feb. 6, 2007.
U.S. Appl. No. 10/946,630, Official Communication mailed Aug. 16, 2006.
U.S. Appl. No. 10/863,926, Official Communication mailed Jun. 26, 2007.
U.S. Appl. No. 10/863,926, Official Communication mailed Dec. 29, 2006.
U.S. Appl. No. 10/863,926, Official Communication mailed Aug. 14, 2006.
U.S. Appl. No. 10/863,926, Official Communication mailed Feb. 28, 2006.
U.S. Appl. No. 10/863,926, Official Communication mailed Sep. 9, 2005.
U.S. Appl. No. 10/863,926, Official Communication mailed Apr. 6, 2005.
U.S. Appl. No. 10/946,636, Official Communication mailed Jul. 27, 2007.
Non-Final Office Action for U.S. Appl. No. 10/946,636 mailed Dec. 13, 2007.
Final Rejection mailed Dec. 17, 2007 for U.S. Appl. No. 10/863,926, filed Jun. 8, 2004.
Final Rejection mailed Jan. 29, 2008 for U.S. Appl. No. 10/946,630, filed Sep. 21, 2004.
Non-Final Rejection mailed Mar. 3, 2008 for U.S. Appl. No. 11/392,247, filed Mar. 29, 2006.
The Official America Online for Windows Tour Guide, Second Edition. Copyright 1994 Tom Lichty. pp. 239-256.
U.S. Patent and Trademark Office Communication dated Dec. 8, 2008 for corresponding U.S. Appl. No. 11/314,204, filed Dec. 20, 2005 (33 pages).
U.S. Appl. No. 10/946,630 Office Communication mailed Jun. 12, 2009.
U.S. Appl. No. 11/392,247, Official Communication mailed Apr. 16, 2009.
"The Matchmaker Network Systems Page," System names and Numbers, 3 pages, http://web.archive.org/web/19990424123143/www.christian.matchmaker.com/systems (accessed Feb. 15, 2007).
U.S. Appl. No. 11/314,201, Official Communication mailed Nov. 1, 2007.
U.S. Appl. No. 11/314,201, Official Communication mailed May 17, 2007.
U.S. Appl. No. 11/314,206, Official Communication mailed Jul. 9, 2009.
Office Communication for U.S. Appl. No. 10/863,926, mailed on May 14, 2009.
U.S. Appl. No. 11/392,247, Official Communication mail date Apr. 16, 2009.
friendster.com in U.S. Appl. No. 11/561,254 on Oct. 8, 2010.
orkut.com in U.S. Appl. No. 11/561,254 on Oct. 8, 2010.
eharmony.com in U.S. Appl. No. 11/561,254 on Oct. 8, 2010.
facebook.com in U.S. Appl. No. 11/561,254 on Oct. 8, 2010.
match.com in U.S. Appl. No. 11/561,254 on Oct. 8, 2010.
hotornot.com in U.S. Appl. No. 11/561,254 on Oct. 8, 2010.
myspace.com in U.S. Appl. No. 11/561,254 on Oct. 8, 2010.
cybersuitors.com in U.S. Appl. No. 11/561,254 on Oct. 8, 2010.
Hines, M. "America Online proposes Love.com" http://news.com.com/2100-1038-5117686.html, Dec. 9, 2003.
Hines, M. "AOL Serves up software for BREW" http://news.com.com/2100-1032-5118986.html, Dec. 10, 2003.
Jordan, K., et al. "The Augmented Social Network: Building identity and trust into the next-generation internet," First Monday Peer-Reviewed Journal on the Internet, Jul. 2003 http://www.firstmonday.dk/issues/issue88/jordan/.
Hallett, Vickey "Shopping: Bagging the Best Deals Online," U.S. News & World Report Nov. 12, 2006, 2 pages http://www.usnews.com/usnews/biztech/articles/061112/20sites.shopping.htm, accessed May 17, 2007.
Tedeschi, Bob, "Filling a gap online, shoe sales shine," International Herald Tribune, Oct. 23, 2006, 2 pages http://iht.com/articles/2006/10123/business/ecom.php, accessed May 17, 2007.
MetricStream, Enterprise Quality and Compliance Management Solutions, "Zaplet Technology within MetricStream" www.metricstream.com/products/zap_tec_ms.htm, Sep. 16, 2005.
Gmail, "About Gmail" http://mail.google.com/mail/help/about.html, accessed Sep. 16, 2005.
True U, "Using True" www.true.com/magazine/true_coach_summertips_part9.htm, accessed Sep. 16, 2005.
AmericanSingles.com, "Learn More about AmericanSingles.com" visited Sep. 16, 2005, www.americansingles.com/default.asp?p=13010&CategoryID=62.

(56) References Cited

OTHER PUBLICATIONS

Office Communication for U.S. Appl. No. 10/946,630 mailed Oct. 16, 2008.
Office Communication for U.S. Appl. No. 10/946,630 mailed Mar. 10, 2009.
Office Communication for U.S. Appl. No. 10/946,636 mailed Feb. 9, 2009.
Office Communication for U.S. Appl. No. 11/392,247 mailed Nov. 4, 2008.
International Search Report and Written Opinion for International Patent Application No. PCT/US2004/038696 mailed Oct. 3, 2006.
International Search Report for International Patent Application No. PCT/US2004/038704 mailed Jul. 7, 2005.
International Search Report for International Patent Application No. PCT/US2005/031142 mailed Oct. 24, 2006.
International Search Report and Written Opinion for International Patent Application No. PCT/US2007/070525 mailed Oct. 29, 2007.
International Preliminary Report on Patentability for International Patent No. PCT/US2005/032417 mailed Feb. 14, 2006.
US Patent & Trademark Office, Office communication mailed Nov. 23, 2009 in U.S. Appl. No. 11/392,247, 17 pages.
Office action mailed Feb. 5, 2010 issued during prosecution of U.S. Appl. No. 10/946,630.
U.S. Appl. No. 10/946,630, Official Communication mailed May 28, 2008.
U.S. Appl. No. 10/863,926, Official Communication mailed Apr. 16, 2008.
U.S. Appl. No. 10/863,926, Official Communication mailed Aug. 1, 2008.
U.S. Appl. No. 10/863,926, Official Communication mailed Apr. 1, 2009.
U.S. Appl. No. 11/392,247, Official Communication mailed Jan. 1, 2009.
PCT Preliminary Report on Patentability for Application No. PCT/US2004/038707 mailed Aug. 10, 2006.
PCT Preliminary Report on Patentability for Application No. PCT/US2004/038705 mailed Oct. 26, 2006.
"Design Center Tutorial: Preview and Test Dynamic Pages on a Testing Server," Adobe.com, 6 pages, http://www.adobe.com/designcenteadreamweaver/articles/drw8at_testserver.html (accessed Sep. 2, 2008).
Office Communication for U.S. Appl. No. 10/863,926, mailed Sep. 29, 2009 (12 pages).
Office Communication for U.S. Appl. No. 10/946,630, mailed Oct. 26, 2009 (14 pages).
Lorrie Faith Cranor et al., "Spam," Communications of the ACM, Aug. 1998, pp. 74-83, vol. 41, No. 8.
Matt Hines, "America Online proposes Love.com," Dec. 10, 2003 <http://news.com.com/2100-1032-5118986.html>.
Matt Hines, "AOL serves up software for BREW", Dec. 9, 2003, <http://news.com.com/2100-1038-5117686.html>.
Ken Jordan et al., "The Augmented Social Network: Building identity and trust into the next-generation internet," First Monday Peer-Reviewed Journal on the Internet, (Jul. 2003) <http://www.firstmonday.dk/issues/issue8_8/jordan/>.
International Search Report and Written Opinion of the International Searching Authority, mailed Oct. 3, 2006 for International Patent Application PCT/US04/38696 filed on Nov. 17, 2004.
International Search Report dated Jul. 7, 2005 issued in International Application No. PCT/US04/38704 2 pp.
USPTO Office Communication mailed Jan. 12, 2009 in related U.S. Appl. No. 10/863,926.
USPTO Office Communication mailed Feb. 9, 2009 in related U.S. Appl. No. 10/946,636.

* cited by examiner

METHOD AND SYSTEM FOR SHARING PORTAL SUBSCRIBER INFORMATION IN AN ONLINE SOCIAL NETWORK

CROSS-REFERENCE TO RELATED APPLICATIONS

This Utility Application claims priority from U.S. Provisional Application No. 60/540,505, filed Jan. 29, 2004, and from U.S. Provisional Application No. 60/544,639, filed Feb. 13, 2004, the benefit of the earlier filing dates of which are hereby claimed under 35 U.S.C. 119(e).

FIELD OF THE INVENTION

The present invention relates generally to computing software for making a user's online portal information available to the user's online social network, and more particularly to a method and system for accessing information regarding the user's stored information and behaviors through the online portal for use in the user's online social network.

BACKGROUND OF THE INVENTION

A social network typically comprises-a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first degree relationships. First degree relationships can have varying degrees of closeness, trust, and other characteristics. These relationships can also be unidirectional or bidirectional. A unidirectional relationship typically means that a first person is willing and able to interact with a second person, but the second person is not willing or able to interact with the first person. Conversely, a bidirectional relationship typically means that both people are willing and able to interact with each other.

Indirect personal relationships typically include relationships through first degree relationships to people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second degree relationship.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may. Similarly, the phrase "in another embodiment," as used herein does not necessarily refer to a different embodiment, although it may.

The term "based on" is not exclusive and provides for being based on additional factors not described, unless the context clearly dictates otherwise.

Briefly stated, the present invention is directed towards providing a system, apparatus, and method for making a user's online behavior information available to the user's online social network. Accordingly, the term "user" can include an online portal subscriber and/or an online social network user. The term social network can include a group of people with which a user has direct and/or indirect relationships, as well as a service for communicating information to and/or from any of the people with which a user has direct and/or indirect relationships.

However, an indirect relationship can also be through a shared interest, without any degree of personal relationship between intermediate people. For example, a set of complete strangers can comprise a social network on the basis of a common interest in a topic or an activity, such as fishing. At first, each person may only have a relationship with the activity of fishing, without any relationship through other people in the set. However, the activity of fishing can act as a node that binds the set of people into a social network, just as if the node were a mutual friend of each person in the set. The members of the set can build people relationships by somehow expressing to each other the common interest in the activity. Once a person is aware of another person with the same interest, the people can choose to interact. Thus, the term social network includes a group of people associated by a common interest and/or a service for communicating information to and/or from any of the people with which a user has an interest relationship.

Personal relationships and/or interest relationships can be utilized to find and develop relevant connections for a variety of activities, such as job networking, service referrals, dating, and the like. Finding and developing relevant connections can be accelerated with online services. Online social networking can be used to mine personal and/or interest relationships in a way that is often more difficult and/or time-consuming to do offline. However, because individuals are more likely to trust and value the opinions of people they know, over those of complete strangers, it may take additional time for new members of an online social network to be trusted by existing members of the online social network. This trust can be built faster if additional information about the new member is available, especially if the additional information comes from a trusted source. It is with respect to these considerations and others that the present invention has been made.

To build trust quickly, information about a new member gathered from other venues can be provided to the existing members of the online social network. For example, information about a new member's behavior in an online portal can be made accessible to existing members of the online social network. In addition to behavior information, such portal information can comprise user-defined information, portal assessment information, and the like. User-defined information can include contact lists, preferences, survey responses, and other information provided by the user. User behavior information can include frequency of visiting Web sites, types of online purchases, types of online communication used most often, duration of participating in online activities, and other information that can be detected about a user's online actions. Portal assessment information can include compliments about a user, complaints about a user, reputation assessments from peer users, comparison between user-defined information and user behavior information, spam detection about a user, and other information determined by others about a user. Many other types of information can be stored and/or determined by an online portal regarding a user. The present invention enables members of an online social network to access and/or share portal information, thereby enabling members to learn more about each other, to quickly identify compatible members, to speed the process of building trust among members, and generally to enhance experiences relating to the online social network.

Illustrative Operating Environment

Figure 1:
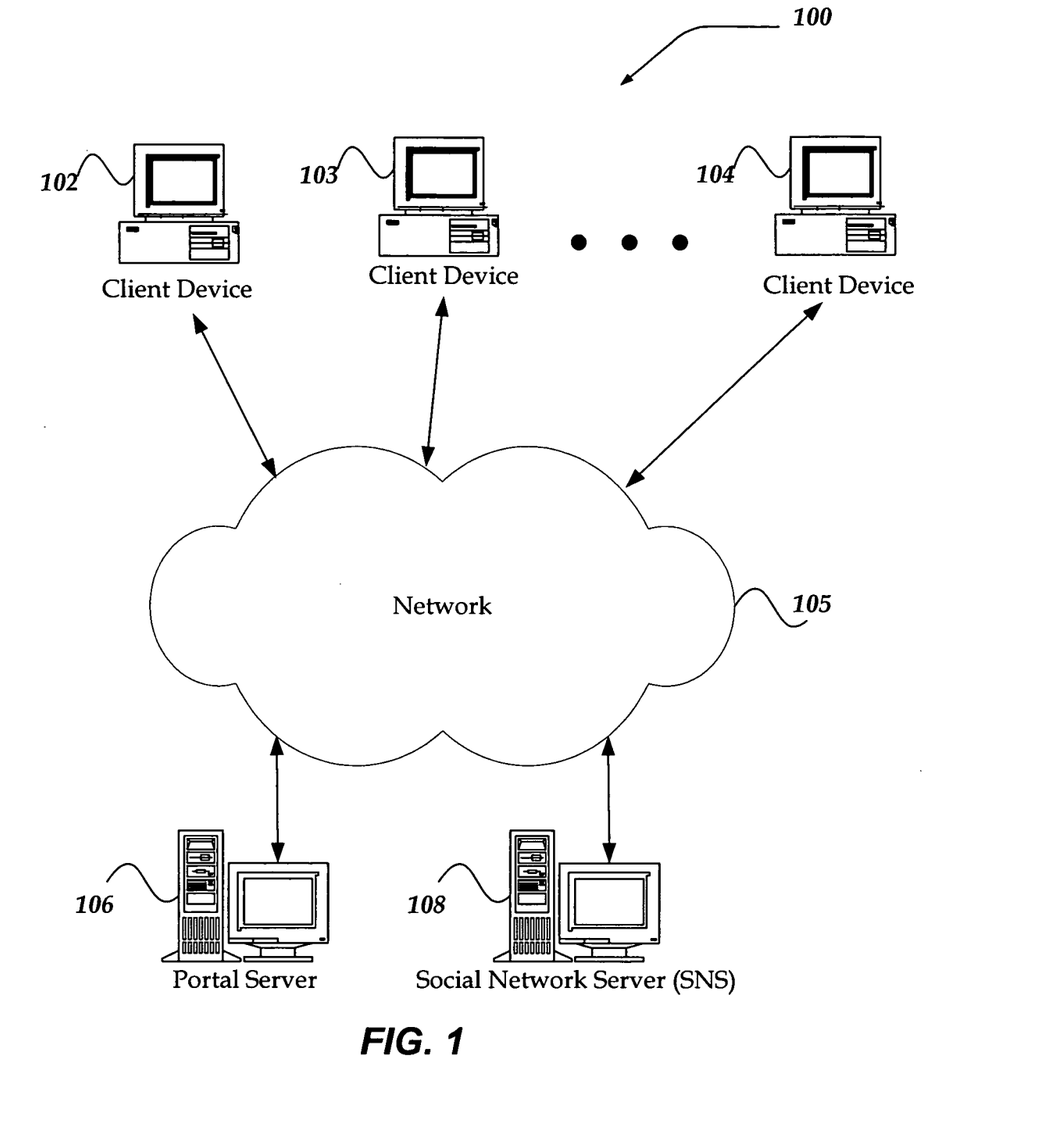
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 100 includes client devices 102-104, a network 105, a portal server 106, and a social network server (SNS) 108. Network 105 is in communication with and enables communication between each of client devices 102-104, portal server 106, and SNS 108.

Client devices 102-104 may include virtually any computing device capable of receiving and sending a message over a network, such as network 105, to and from another computing device, such as portal server 106 and/or SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to receive and to send web pages, and the like. The browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to access and/or manage a portal profile, an SNS profile, SNS category information, SNS activity participation, and the like, which may in turn be saved at a remote location, such as portal server 106 and/or SNS 108, and the like. As such, client devices 102-104 may further include a client application that is configured to manage various actions on behalf of the client device. For example, the client application may enable a user to interact with the browser application, email application, and the like, to customize the user's interaction with an online portal, to customize how another social network user might view a persona, profile, or the like. For example, the user may employ the client application, in part, to establish and/or modify an online portal profile, to interact with online portal services, such as financial information tools, to make online purchase, to store and communicate with contacts, and the like. The user may also employ the client application, in part, to establish and/or modify a portal profile and/or an SNS profile, to establish categories of SNS relationships to provide one customized view of SNS profile information for family members, another customized view for poker members, yet another view for fishing buddies, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links. Furthermore, remote computers and other related electronic devices could be remotely connected to either LANs or WANs via a modem and temporary telephone link. In essence, network 105 includes any communication method by which information may travel between client devices 102-104, portal server 106, and SNS 108.

The media used to transmit information in communication links as described above illustrates one type of computer-readable media, namely wired and/or wireless communication media. Generally, computer-readable media includes any media that can be accessed by a computing device. Computer-readable media may include computer storage media, communication media, or any combination thereof. Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of portal server 106 and/or SNS 108 is described in more detail below in conjunction with FIG. 2. Briefly, however, portal server 106 and/or SNS 108 may include any computing device capable of connecting to network 105 to communicate information between portal server 106 and SNS 108 associated with a user, such as a user of at least one of client devices 102-104. Devices that may operate as portal server 106 and/or SNS 108 include personal computers desktop computers, multiprocessor systems, microprocessor-based or programmable consumer electronics, network PCs, servers, and the like. Portal server 106 and SNS 108 can be arranged in a client-server relationship relative to each other and/or relative to client devices 102-104. Client devices 102-104 can also be combined with portal server 106 and/or SNS 108, such that one client-server relationship is formed or such that a single computing device is used for all operations.

Portal server 106 may be configured to send and/or make accessible, portal information associated with a user, and configured to enable the user to customize at least a portion of the portal information. Similarly, a SNS 108 may be configured to receive and/or access, the portal information and user input information for use as online social network information, and configured to enable the user to customize at least a portion of the social network information. The social network information may include, but is not limited to, user profile information, contact information, relationship category information, an activity, membership information associated with a relationship category, and the like.

SNS 108 may further employ the received and entered social network information to enable the user to customize a view associated with a social network relationship. By providing customized views, the user may put forth different online profiles, public personas, and the like, by sharing varying quantities of personal information with another social network user. Criteria employed to enable customization of the views may include, but is not limited to, degrees of separation, category of relationship (such as family, friend, colleague, and the like), as well as any assessment of closeness, trust, and the like, based on information about the relationship between the user and the prospective viewer, and the like. SNS 108 may also enable another social network user to view the customized view based on the received criteria. SNS 108 may employ a web service, email service, and the like, to make the customized view available to the other social network user, such as a user of one of client devices 102-104.

Illustrative Server Environment

Figure 2:
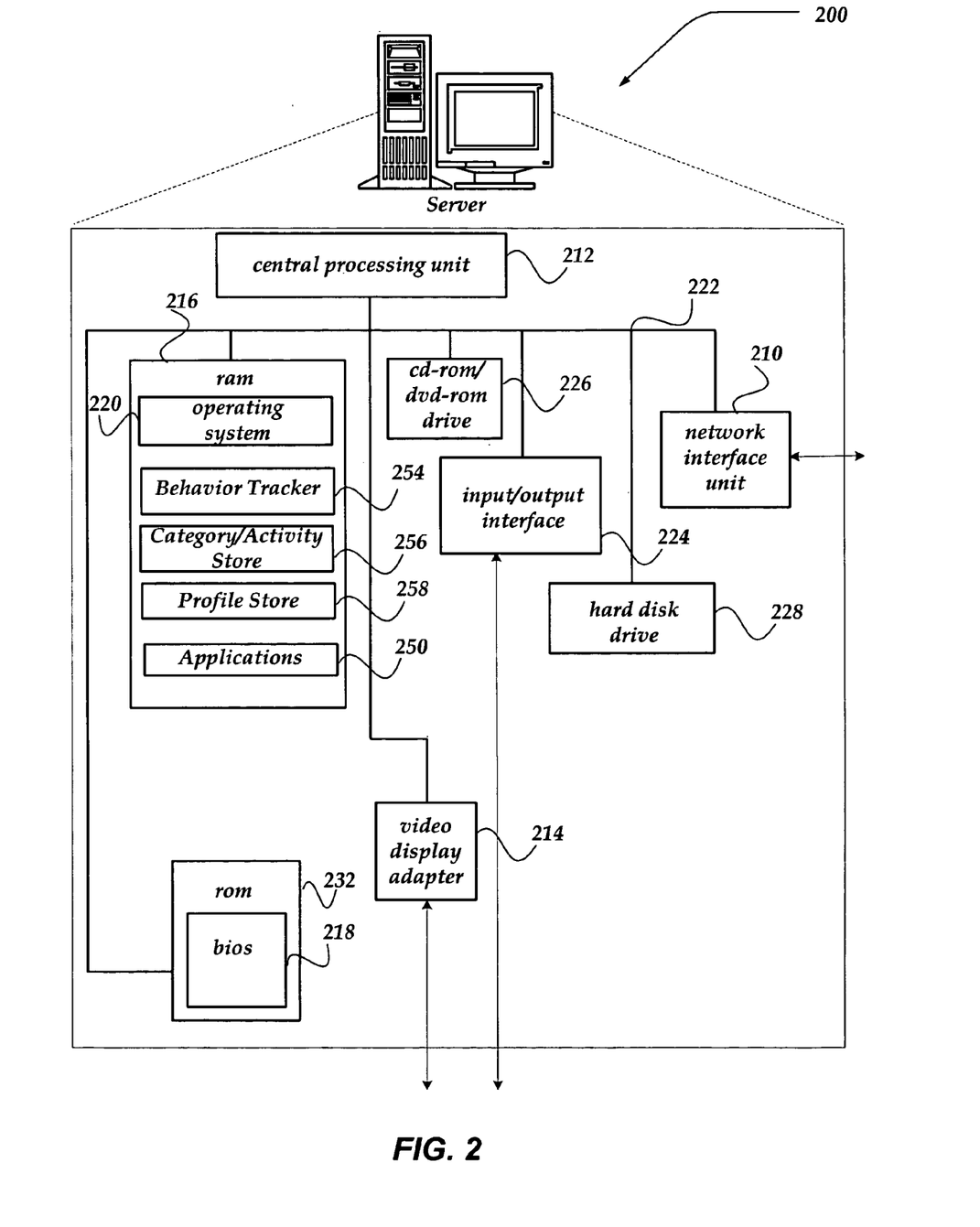
FIG. 2 shows one embodiment of a server device that may be included in a system implementing the invention.

FIG. 2 shows a functional block diagram of an exemplary server 200, according to one embodiment of the invention. Server 200 can comprise a portal server 106 and/or SNS 108. Client devices 102-104 can be similarly configured. Server 200 may include many more components than those shown. The components shown, however, are sufficient to disclose an illustrative embodiment for practicing the invention.

Server 200 includes a processing unit 212, a video display adapter 214, and a mass memory, all in communication with each other via a bus 222. The mass memory generally includes RAM 216, ROM 232, and one or more permanent mass storage devices, such as an optical drive 226, a hard disk drive 228, a tape drive, and/or a floppy disk drive. The mass memory stores an operating system 220 for controlling the operation of server 200. Any general-purpose operating system may be employed. A basic input/output system ("BIOS") 218 is also provided for controlling low-level operation of server 200. As illustrated in FIG. 2, server 200 can communicate with the Internet, or some other communications network, such as network 105 of FIG. 1, via a network interface unit 210, which is constructed for use with various communication protocols including transmission control protocol/Internet protocol (TCP/IP). Network interface unit 210 is sometimes known as a transceiver, transceiving device, network interface card (NIC), and the like. Server 200 also includes input/output interface 224 for communicating with external devices, such as a mouse, keyboard, scanner, or other input devices not shown in FIG. 2.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as a behavior tracker 254, a category/activity store 256, and a profile store 258.

Category/activity store 256 may include a database, text, folder, file, and the like, that is configured to maintain and store information that identifies a relationship category, an activity, and the like. While category/activity store 256 may store identification information, profile store 258, described below, may store profile and criteria information for each portal subscriber and/or social network user. Profile store 258 can comprise multiple distributed data stores, such as a portal subscriber profile data store on portal server 106, and a social network profile data store on SNS 108.

A category may represent a classification of users and/or corresponding relationships within a user's social network, such as family members, friends, co-workers, poker buddies, fishing buddies, and the like. Social network users can establish their own categories and profile information based on corresponding portal profile data and/or manually entered data. Information relating to a category may be accessible to those identified as members of the category by the creating social network user. However, the invention is not so limited, and global categories may be established that provide profile information about a social network user to virtually any other social network user. Each category may include a set of user-definable social network user information. When the category is user-definable, the set of social network user information (profile information) may also be user-definable. For example, the user may determine that social network user information associated with hobbies may be included in a category for sports, while it may be excluded from a category associated with religion, and the like.

An activity may include virtually any way, manner, and the like, in which a social network user may select to employ their social network connections. For example, activities may include, but are not limited to, dating, job seeking, reconnecting with military comrades, communicating with fellow alumni, seeking help & advice, and the like. It may be desired, although not required, that an activity be globally configured and managed by an online social network service, and made available to all users of the online social network service. Additionally, at least a minimum set of profile information associated with the activity may be globally established. For example, if the activity includes dating, the minimum set of profile information, may include, but is not limited to age, sexual preference, information associated with one's physical appearance, and the like. If the activity includes job search, employment search, and the like, the minimum set of profile information may include, but is not limited to, job history, salary desired, job qualifications, experience, and the like. However, an activity may further include an optional set of profile information, such as achievements, hobbies, recommendations, and the like. Such profile information can be provided from the portal to the online social network service or otherwise accessed by the online social network service.

Profile store 258 may include a database, text, folder, file, and the like, that is configured to maintain and store information associated with a portal subscriber and/or a corresponding social network user. For example, a portal subscriber's portal profile may include, but is not limited to such information as name, alias, nickname, age, email address, address book, online behaviors, and the like. In one embodiment, a collection of such information may be provided to an online social network service to comprise a basic social network profile for the social network user. Additional information may also be included in profile store 258 that includes category profile information, activity profile information and the like. Such additional information may include, but is not limited to, a photograph, a hobby, a job history, a school history, career information, dating information, military information, sports information, religious information, sexual orientation, politics, interests, favorite sites, self description, frequency of accessing a Web site, duration of participating in an online activity, number of purchases made from an online vendor, and the like. In one embodiment, at least some information includes a Universal Resource Locator (URL). Virtually any information associated with the portal subscriber and associated social network user may be included within profile store 258.

Moreover, profile store 258 may store and maintain criteria associated with how profile information may be viewed by another social network user. For example, profile store 258 may include criteria indicating that only a member of a particular category may view a particular photograph, a subset of profile information, and the like. While information may be selected at a field by field level of granularity, the present invention however, is not so limited. For example, the present invention enables the social network user to establish criteria that is based on a relationship between the prospective viewer and the user. The relationship criteria may then be employed to map various collections, groupings, sets, and the like, of portal profile information, to a corresponding social network profile. As such, the social network user, for example, may establish criteria such that any other social network user that is within some predetermined degrees of separation may view a predetermined set of social network profile information that is mapped from corresponding portal profile information.

Behavior tracker 254 is configured to detect and store information regarding a portal subscriber's online actions and can determine profile characteristics about the portal subscriber. For example, behavior tracker 254 can detect that a portal subscriber navigated to one or more news Web sites at approximately the same time each day for a current month, spent approximately twenty hours playing an online game during each week of the current month, made purchases from multiple overseas vendors of copied software, participated in a hacker chat room, performed searches for movie times, sent an email messages to a thousand sequential addresses in one day, and/or performed other actions. From these actions, behavior tracker 254 can determine characteristics about the portal subscriber, assess the accuracy of information provided by the portal subscriber to the online portal, gather feedback about the portal subscriber submitted by other portal subscribers, and perform other tracking and evaluation operations. For instance, behavior tracker 254 can give a low weighting to portal profile information submitted by the portal subscriber, which indicated that the portal subscriber was a practicing dentist. Behavior tracker 254 might also set a flag, indicating that the portal subscriber might be engaged in spamming. Other aspects of behavior tracker 254 are described in more detail below in conjunction with FIGS. 3-5.

Although illustrated in FIG. 2 as distinct components in server 200, behavior tracker 254, category/activity store 256, and profile store 258 may be arranged, combined, and the like, in any of a variety of ways, without departing from the scope of the present invention. For example, category/activity store 256 may be arranged as separate components, such as an activity store and a category store, or the like. Moreover, behavior tracker 254, category/activity store 256, and profile store 258 may reside in one or more separate computing devices, substantially similar to server 200, such as portal server 106 and SNS 108.

Server 200 may also include a simple mail transfer protocol (SMTP) handler application for transmitting and receiving email. Server 200 may also include a hypertext transfer protocol (HTTP) handler application for receiving and handing HTTP requests, and an HTTP secure sockets (HTTPS) handler application for handling secure connections. The HTTPS handler application may initiate communication with an external application in a secure fashion.

Portal Process

Figure 3:
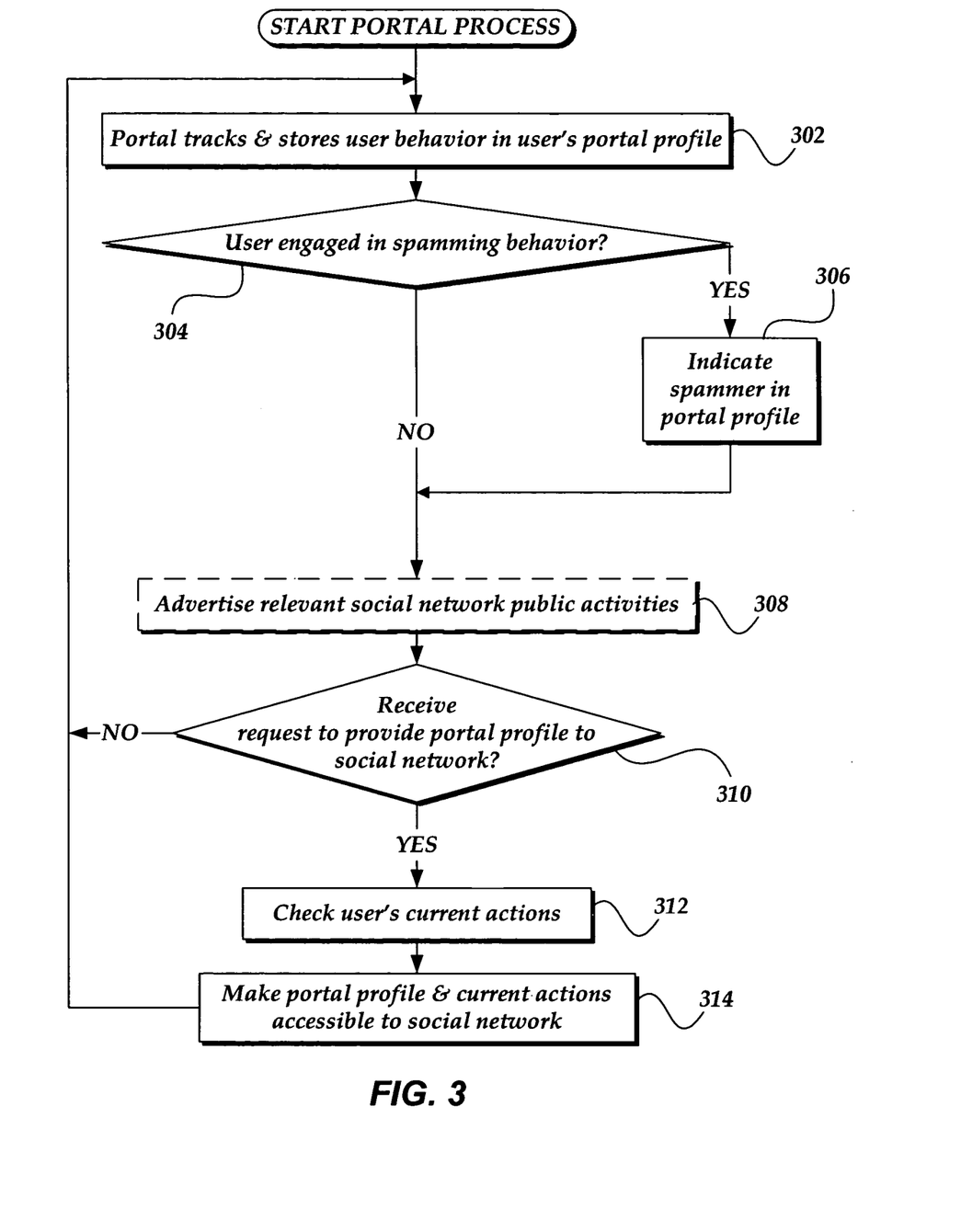
FIG. 3 illustrates a logical flow diagram generally showing one embodiment of a process for an online portal to make portal subscriber information available to an online social network service.

The operation of certain aspects of the present invention will now be described with respect to FIGS. 3-4. Briefly, FIG. 3 illustrates a logical flow diagram generally showing one embodiment of a process for an online portal to make portal subscriber information available to an online social network service. The process may be implemented, for example, within portal server 106 of FIG. 1, and accessed employing a client device, such as client devices 102-104 of FIG. 1.

The process is typically entered when portal subscriber registers with an online portal. Initially, a portal subscriber's portal profile may only include a user ID. However, the portal subscriber can enter other information such a name, age, preferences, interests, contact list, and the like. The entered information is stored in the portal profile and is usually accessible to the portal subscriber. Typically, with the portal subscriber's consent, the online portal also tracks and stores the portal subscriber's behavior in a portal profile, at an operation 302. Some, or all, of the tracked information can be accessible to, or hidden from, the portal subscriber. In addition, the portal can add information to the portal profile indicating characteristics, possible interests, and/or other information determined about the portal subscriber. For example, the portal can determine that the portal subscriber uses the portal mostly to read news, mostly to find a job, mostly to write blogs, and/or other usage habits.

At a decision operation 304, the portal can use some of the above information to determine whether the portal subscriber has engaged in spamming behavior, and/or other behavior that is deemed undesirable by portal operators, by other portal subscribers, by law, and the like. If the portal determines that the portal subscriber has engaged in undesirable behavior, such as spamming, the portal can indicate this fact in the portal subscriber's portal profile, at an operation 306. The portal can also take additional action if desired, such as warning the portal subscriber, sanctioning the portal subscriber, terminating the portal subscriber's access to the portal, and the like.

Whether or not the portal subscriber has engaged in undesirable behavior, the portal can optionally provide a advertisements and/or perform other operations, at an operation 308, based on information entered, tracked, and/or determined regarding the portal subscriber. As an example, the portal can determine and advertise an online social network service that the portal subscriber might find interesting. More specifically, the portal can advertise one or more social network activities for which the portal subscriber's portal profile data sufficiently matches membership criteria in the social network activity. The advertisement can include a link to the matching social network activities.

If the portal subscriber decides to participate in a social network, the information already obtained through the portal can be provided to the social network. Accordingly, at a decision operation 310, the portal determines whether a request has been received from the portal subscriber, from the social network, and/or from an intermediary, to provide the portal profile information to the social network. When no request is received, the portal process returns to operation 302 to continue tracking the portal subscriber's behavior. When a request is received, the portal checks the portal subscriber's current actions, at an operation 312. Current actions can include listening to music streamed to the portal subscriber's computer, viewing a particular Web site, and the like. The current actions and the portal profile can then be made accessible to the social network, at an operation 314. Portal processing again returns to operation 302 to continue tracking the portal subscriber's behavior.

Social Network Service Processes

Figure 4:
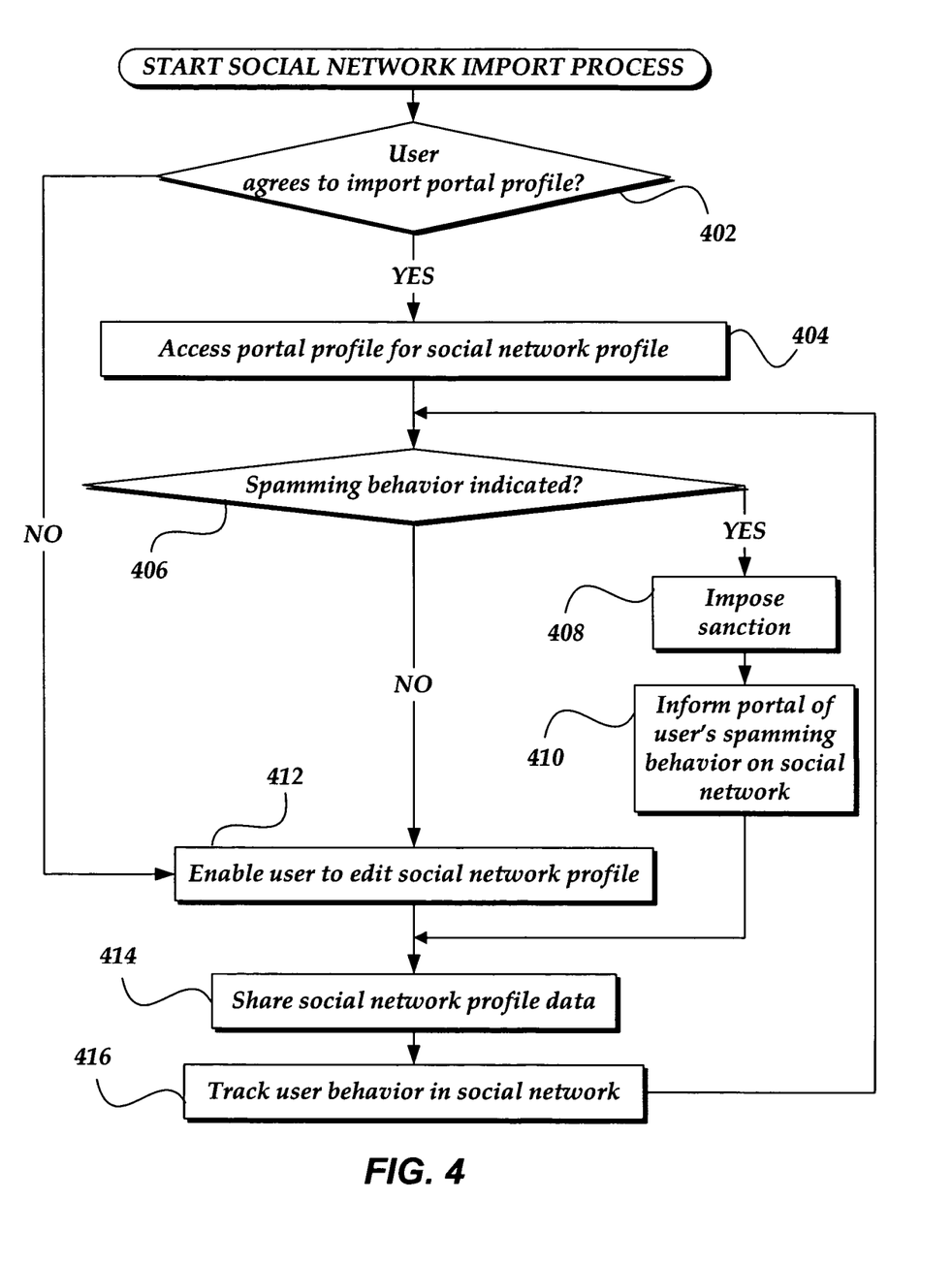
FIG. 4 illustrates a logical flow diagram generally showing one embodiment of a process for an online social network service to access a portal subscriber's portal profile and to share the portal profile information with appropriate members of the social network.

FIG. 4 illustrates a logical flow diagram generally showing one embodiment of a process for an online social network service to access a portal subscriber's portal profile and to share the portal profile information with appropriate members of the social network. The process may be implemented, for example, within SNS 108 of FIG. 1, and accessed employing a client device, such as client devices 102-104 of FIG. 1. Although SNS 108 is described as a separate server, SNS 108 and/or client devices 102-104 can be considered client devices relative to portal server 106 of FIG. 1. Each of client devices 102-104 can also act as a server and/or client of other client devices 102-104.

The process is typically entered when a portal subscriber registers as a user of an online social network service and requests importation of the user's corresponding portal profile information. At a decision operation 402, the online social network service determines whether the user has agreed to import, or otherwise access, the user's corresponding portal profile information through an interface with the online social network service. If the user has not agreed, processing continues as if the user does not have portal profile information. In that case, the user would have to enter information and/or the online social network service would have to track the user's behavior through the online social network service. However, if the user agrees to import, or otherwise access, the user's corresponding portal profile information, the online social network service accesses the portal profile at an operation 404. The access and/or importation can comprise a mapping of portal profile data fields to social network profile data fields. Such a mapping can be complete or partial. For example, with one click, the user's entire portal profile can be imported to create the user's social network profile. Conversely, if the user is logged onto the portal, the user can export the user's entire portal profile with one click to create the user's social network profile. Alternatively, the user can select to create a vertical profile that corresponds to a social network activity, category, and/or other grouping. For instance, the user can select to create a resume profile, a personals profile, and the like. A predefined set of data fields from the user's portal profile can be mapped to the vertical profile as an export or import operation from the portal service or the social network service, respectively. The vertical profile can be a separate profile and/or a subset of the user's portal profile and/or the user's social network profile.

At a decision operation 406, the online social network service can evaluate the information now in the social network profile to determine whether the user engaged in undesirable behavior, such as spamming. The social network profile can be analyzed independently by the online social network service and/or the social network profile can simply include a flag from the portal profile, indicating that the user engaged in undesirable behavior through the portal. Based on this evaluation, the online social network service and/or members of the social network can take precautionary actions. For example, at an operation 408, the online social network service can impose a sanction on the user, limit the user's access to all or portions of the online social network service, issue a warning to the user, increase scrutiny of the user's subsequent actions related to the online social network service, and the like. Similarly, at an operation 410, the online social network service can inform the user's portal, and/or other social network users, of the user's previous portal misbehavior(s) and/or current misbehaviors through the online social network service.

If the user has not engaged in undesired behavior, or if the user's portal profile data has not been accessed, the online social network service can enable the user to edit the user's social network profile, at an operation 412. If there is an indication that the user engaged in undesired behavior, the user may be restricted from editing all, or portions, of the user's social network profile. This restriction can prevent the user from removing indications that the user engaged in undesired behavior. However, aside from any restriction, the user can add and/or modify information in the user's social network profile. For example, the user may wish to retain much of the information imported from the user's corresponding portal profile, which is based on the user's individual interactions with the online portal, but remove information about some of those interactions that the user does not wish to share with any members of the social network. Alternatively, or in addition, the user may wish to indicate an interest in activities that were not available through the online portal.

Based on the information imported from the portal profile and/or revisions to the social network profile, the online social network service can share appropriate portions of the user's social network profile data with other members of the online social network service, at an operation 414. For instance, the imported portal profile data may indicate that the user frequently visited a certain college's alumni Web site through the online portal, but had not necessarily participated in a corresponding alumni service through the portal. The social network profile may also be modified when the user joins a job seeking activity through the online social network service. With this combination of information available, the online social network service can be configured (by the user and/or by the online social network service) to share the user's work-related information with potential employers involved in the job seeking activity who have also indicated an association with the same college. Such assessments of portal profile data can help the user build a relevant social network through the online social network service quickly and easily. Additional detail regarding sharing profile data is described below with regard to FIG. 5.

The online social network service can make additional assessments by tracking the user's behaviors associated with the online social network service, at an operation 416. For example, the online social network service can track frequency, duration, and/or other attributes of the user's participation in various activities. The online social network service can periodically evaluate the user's behaviors, at decision operation 406, to detect any undesirable behaviors such as spamming. This periodic evaluation can assess behaviors tracked by the online social network service, and/or the online social network service can access updated information from the corresponding portal profile.

Figure 5:
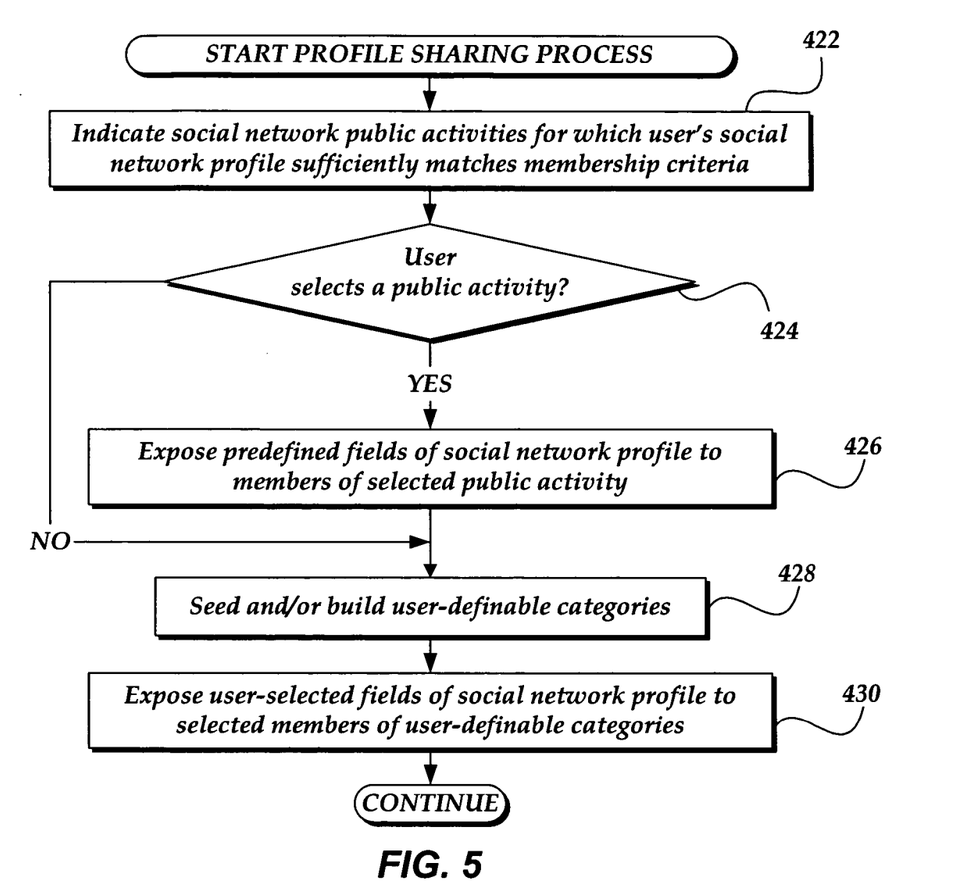
FIG. 5 illustrates a logical flow diagram generally showing one embodiment of a process for sharing portal subscriber information with relevant members of a social network.

FIG. 5 illustrates a logical flow diagram generally showing one embodiment of a process for sharing portal subscriber information with relevant members of a social network, as introduced with regard to operation 414 of FIG. 4. The process may be implemented, for example, within SNS 108 of FIG. 1, and accessed employing a client device, such as client devices 102-104 of FIG. 1.

At an operation 422, the online social network service can compare the imported portal profile data, current actions, and/or other portions of the social network profile data with membership criteria for public activities available through the online social network service. A public activity can comprise activity that is available to any interested member of the online social network service, such as a job seeking activity, a dating activity, and the like. A statistical analysis of the user's profile data can be performed to determine whether any statistically significant matches exists. For example, if the user's corresponding portal profile indicates frequent visits to the portal's stock portfolio tracking service, then the user might be interested in joining a public investment club. Sufficiently matching public activities can be advertised to the user with corresponding links.

The online social network service can determine, at a decision operation 424, whether the user has selected to participate in one or more of the matching public activities. If the user has elected to participate in a public activity, the online social network service can expose one or more predefined data fields from the user's social network profile, at an operation 426, to other users who are participating in the same public activity. The predefined data fields can be those data fields that are predetermined to be relevant to the selected public activity. The corresponding data of the predefined data fields can be data that was obtained from the user's corresponding portal profile and/or data obtained through the online social network service. Exposing such relevant data can be performed by simply making the relevant data available for searching by other members of the activity. Alternatively, or in addition, the online social network service can send an announcement to the other members of the activity. If the user did not select a public activity, operation 426 may be skipped and only limited data, or no data, may be exposed to other members of the online social network service.

Regardless of whether the user elects to participate in a public activity, the online social network service can automatically seed, or otherwise build, user-defined categories, at an operation 428. User-defined categories comprise groups of people who have corresponding user-defined relationships with the user, such as family relationships, friend relationships, acquaintance relationships, professional relationships, and the like. The relationships and corresponding groups of people can be identified from contact lists, buddy lists, lists of favorite celebrities, lists of most admired business leaders, and/or other data obtained from the portal profile and updated social network profile. Such lists can be entered by the user and/or determined by evaluating the user's behaviors in relation to the portal and/or the social network. For instance, the portal may determine a list of most admired business leaders, by evaluating biographical books purchased by the user through the portal.

The online social network service can use some of the data, such as contact lists, to establish the user's first degree relationships with people in the contact list who are also members of the online social network service. These relationships can be established automatically, or the lists can be used to issue invitations through the online social network service. The invitations should include at least an identifier of the inviting user, but may include other user-selectable data about the inviting user. Using invitations gives each recipient an opportunity to decline to carry over a relationship from the portal to the online social network service. This may be useful for unidirectional relationships (i.e., the inviting user wants to associate with the invited user, but the invited user does not want to associate with the inviting user).

For other profile data, such as a list of most admired business leaders, the online social network service can attempt to determine higher degree relationships based on the user's first degree relationships, and/or relationships of those people that the user knows and who also utilize the online social network service.

Once the user-definable categories have been established, the user can choose to have the online social network service expose user-selected data fields to all, or user-selected, members of the user-defined categories, at an operation 430. For user-defined categories that are established by invitations that include some data from the social network profile, additional user-selectable data fields can be exposed. The user-selectable data fields can correspond to user-defined criteria for managing a view of the user's social profile information. The user-defined criteria may be applied towards a user's relationship with each prospective viewer. The user-defined criteria may include degrees of separation between members of the social network, a relationship to the prospective viewer, as well as criteria based, in part, on activities, such as dating, employment, hobbies, and the like. Such user-defined relationship criteria may then be mapped against various user-defined categories of information associated with a social network user to provide customized views of the social network user. Such customized views may be employed to portray various personas to other users of the social network, and to enhance the user's own, overall value of the social networking experience.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the operations indicated in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustrations support combinations of means for performing the indicated actions, combinations of steps for performing the indicated actions and program instruction means for performing the indicated actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for communicating in an online social network with a processing device that enables actions, comprising:
employing the processing device to determine information about a subscriber registered with an online portal, wherein the information includes a portal assessment made by at least one of a plurality of other subscribers of the online portal about the subscriber, and the portal assessment information is related to at least one behavior of the subscriber and at least a portion of the other subscribers of the online portal that make the portal assessment are separate from a plurality of members of the online social network, and wherein the portal assessment information is related to an online action by the subscriber that is separate from and not performed by the subscriber while using the online social network, which is configured to determine multiple degree indirect relationships between members of the online social network based at least in part on first degree direct contact between members of the online social network; and if the subscriber is also registered as a member of the online social network, importing at least a portion of the information from the online portal to a social network profile maintained by at least one social network server on which the online social network is implemented; and sharing at least the portion of the information with at least one other member of the online social network, wherein the at least one other member is invited to establish direct communication with the subscriber based at least in part on the shared information, which is determined at least in part on at least a second degree indirect relationship between the subscriber and the at least one other member, wherein the at least second degree indirect relationship includes:

a first direct relationship between the subscriber and an intermediary member of the online social network, wherein the first direct relationship is established by at least one direct communication between the subscriber and the intermediary member; and a second direct relationship between the intermediary member and the at least one other member, wherein the second direct relationship is established by at least one direct communication between the intermediary member and the at least one other member, and wherein a direct relationship does not exist between the subscriber and the at least one other member prior to establishing direct communication between the subscriber and the at least one other member.

2. The method of claim 1, wherein the online social network includes at least one of:
multiple degrees of separation in relationships among members of the online social network; and
a shared interest among members of the online social network.

3. The method of claim 1, wherein determining the information comprises tracking at least one of:
a frequency with which the subscriber accessed at least one of a portal service and a non-portal Web site;
a duration over which the subscriber accessed at least one of the portal service and the non-portal Web site;
a content type accessed by the subscriber through at least one of the portal service and the non-portal Web site; and
an online purchase made by the subscriber through at least one of the portal service and the non-portal Web site.

4. The method of claim 1, wherein the behavior of the subscriber comprises participating in at least one of an online friend matching service, an online dating service, an online job searching service, an online classmate searching service, an online military colleague searching service, an online club, an online financial service, an online auction, and a online purchase.

5. The method of claim 1, further comprising:
determining that the subscriber has engaged in spamming; and
indicating in the information that the subscriber has engaged in spamming.

6. The method of claim 1, wherein sharing at least the portion of the information to be shared comprises at least one of:
- creating the social network profile from at least the portion of the information;
- creating a vertical profile from at least the portion of the information; and
- mapping a portal profile to a social network profile.

7. The method of claim 1, further comprising revising the information based on a current online action of the subscriber, wherein the current online action includes at least one of playing a media file, receiving a streaming media, viewing a Web page, and participating in an instant message session.

8. The method of claim 1, further comprising:
- comparing the information to membership criteria of at least one social network activity, wherein the at least one social network activity comprises an online activity that is available to any member of the online social network; and
- determining the at least one social network activity for which the information indicates a level of possible interest in the online activity, wherein the level of possible interest corresponds to a degree of matching between the information and the membership criteria of the at least one social network activity.

9. The method of claim 1, further comprising enabling the subscriber to select a public activity in which to participate.

10. A server for communicating in an online social network, comprising:
- a transceiver for receiving and sending information to a computing device;
- a processor in communication with the transceiver; and
- a memory in communication with the processor and storing data and machine instructions that cause the processor to perform a plurality of operations, including:
  - determining information about a subscriber registered with an online portal, wherein the information includes a portal assessment made by at least one of a plurality of other subscribers of the online portal about the subscriber, and the portal assessment information is related to at least one behavior of the subscriber and at least a portion of the other subscribers of the online portal that make the portal assessment are separate from a plurality of members of the online social network, and wherein the portal assessment information is related to an online action by the subscriber that is separate from and not performed by the subscriber while using the online social network, which is configured to determine multiple degree indirect relationships between members of the online social network based at least in part on first degree direct contact between members of the online social network; and
  - if the subscriber is also registered as a member of the online social network, sharing at least a portion of the information with at least one other member of the online social network, wherein the at least one other member is invited to establish communication with the subscriber based at least in part on the shared information.

11. The server of claim 10, wherein the online social network includes at least one of:
- multiple degrees of separation in relationships among members of the online social network; and
- a shared interest among members of the online social network.

12. The server of claim 10, wherein the machine instructions further cause the processor to perform the operation of tracking at least one of:
- a frequency with which the subscriber accessed at least one of a portal service and a non-portal Web site;
- a duration over which the subscriber accessed at least one of the portal service and the non-portal Web site;
- a content type accessed by the subscriber through at least one of the portal service and the non-portal Web site; and
- an online purchase made by the subscriber through at least one of the portal service and the non-portal Web site.

13. The server of claim 10, wherein the behavior of the subscriber comprises participating in at least one of an online friend matching service, an online dating service, an online job searching service, an online classmate searching service, an online military colleague searching service, an online club, an online financial service, an online auction, and a online purchase.

14. The server of claim 10, wherein the machine instructions further cause the processor to perform the operations of:
- determining that the subscriber has engaged in spamming; and
- indicating in the information that the subscriber has engaged in spamming.

15. The server of claim 10, wherein the machine instructions further cause the processor to perform at least one of the operations of
- creating a social network profile from at least the portion of the information; creating a vertical profile from at least the portion of the information; and mapping a portal profile to a social network profile.

16. The server of claim 10, wherein the machine instructions further cause the processor to perform the operation of revising the information based on a current online action of the subscriber, wherein the current online action includes at least one of playing a media file, receiving a streaming media, viewing a Web page, and participating in an instant message session.

17. A method for sharing information in an online social network with a processing device that enables actions, comprising:
- employing the processing device to access portal subscriber information that includes a characteristic of an online portal subscriber registered with the online portal and wherein the portal subscriber information includes a portal assessment made by at least one of a plurality of other subscribers of the online portal about the online portal subscriber, and the portal subscriber's portal assessment information is based at least in part on an online-behavior of the online portal subscriber and at least a portion of the other subscribers of the online portal that make the portal assessment are separate from a plurality of members of the online social network, and, wherein the online behavior includes an online action by the online portal subscriber that is separate from and not performed by the subscriber while using the online social network, which is configured to determine multiple degree indirect relationships between members of the online social network based at least in part on first degree direct communication between members of the online social network; and
- employing the processing device to provide an existing member of the online social network with at least a portion of the portal subscriber information if the online portal subscriber also registers to become a member of the online social network, if the subscriber is also registered as a member of the online social network, wherein the provision of the portion of the portal subscriber information comprises importing the portion from the online portal to a social network profile maintained by at least one social network server on which the online social network is implemented, and wherein the provided information is determined at least in part on at least a second degree indirect relationship between the subscriber and the existing member, and wherein the at least second degree indirect relationship includes:
a first direct relationship between the subscriber and an intermediary member of the online social network, wherein the first direct relationship is established by at least one direct communication between the subscriber and the intermediary member; and
a second direct relationship between the intermediary member and the existing member, wherein the second direct relationship is established by at least one direct communication between the intermediary member and the existing member, and wherein a direct relationship does not exist between the subscriber and the existing member prior to providing the provided information to the existing member.

18. The method of claim 17, wherein the online social network includes multiple degrees of separation in relationships among at least some members of the online social network.

19. The method of claim 18, wherein the portal subscriber information is determined from tracking at least one of:
a frequency of accessing at least one of a portal service and a non-portal Web site;
a duration of accessing at least one of the portal service and the non-portal Web site;
a content type accessed through at least one of the portal service and the non-portal Web site; and
an online purchase made through at least one of the portal service and the non-portal Web site.

20. The method of claim 18, wherein the online behavior comprises interacting with at least one of an online friend matching service, an online dating service, an online job service, an online classmate communication service, an online military colleague communication service, an online club, an online financial service, an online auction, and a product retailer.

21. The method of claim 18, further comprising limiting access to the online social network if the portal subscriber information indicates that the online portal subscriber has engaged in spamming.

22. The method of claim 18, wherein accessing the portal subscriber information comprises at least one of:
creating the social network profile from at least the portion of the information;
creating a vertical profile from at least the portion of the information; and
mapping a portal profile to a social network profile.

23. The method of claim 18, further comprising enabling the online portal subscriber to edit the portal subscriber information.

24. The method of claim 18, further comprising revising the portal subscriber information based on a current online action of the online portal subscriber, wherein the current online action includes at least one of playing a media file, receiving a streaming media, viewing a Web page, and participating in an instant message session.

25. The method of claim 18, further comprising:
comparing the portal subscriber information to membership criteria of at least one social network activity, wherein the at least one social network activity comprises an online activity that is available to any member of the online social network; and
determining the at least one social network activity for which the portal subscriber information indicates a possible interest in participating, wherein a level of possible interest
corresponds to a degree of matching between the portal subscriber information and the membership criteria of the at least one social network activity.

26. The method of claim 18, further comprising enabling the online portal subscriber to select a public activity in which to participate.

27. The method of claim 26, wherein the existing member of the online social network expresses an interest in the public activity, and enabling the existing member of the online social network to view at least a portion of the portal subscriber information, comprises making available to the existing member, a predefined subset of the portal subscriber information related to the public activity.

28. The method of claim 18, further comprising enabling the online portal subscriber to create a subscriber-definable category of online social network members, each with a first degree relationship with the online portal subscriber through the online social network.

29. The method of claim 28, wherein the existing member is invited to join the user subscriber-definable category, and enabling the existing member of the online social network to view at least a portion of the portal subscriber information, comprises making available to the user subscriber-definable category of online social network members, a selectable subset of the portal subscriber information.

30. The method of claim 18, further comprising
determining that the online portal subscriber has engaged in spamming behavior while interacting with the online social network; and
indicating to the online portal that the online portal subscriber has engaged in spamming behavior while interacting with the online social network.

31. The method of claim 20, further comprising imposing a sanction on the online portal subscriber when the online portal subscriber attempts to interact with one of the online portal and the online social network.

32. A client device for sharing portal subscriber information in an online
social network, comprising:
a display;
a transceiver for receiving and sending information to a computing device;
a processor in communication with the display and the transceiver; and
a memory in communication with the processor and storing data and machine instructions that cause the processor to perform a plurality of operations, including:
accessing portal subscriber information that includes a characteristic of an online portal subscriber registered with the online portal and wherein the portal subscriber information includes a portal assessment made by the at least one of a plurality of other subscribers of the online portal about the online portal subscriber, and the portal subscriber's portal assessment information is based at least in part on an online-behavior of the online portal subscriber and at least a portion of the other subscribers of the online portal that make the portal assessment are separate from a plurality of members of the online social network, and, wherein the online behavior includes an online action by the online portal subscriber that is separate from and not performed by the subscriber while using the online social network, which is configured to determine multiple degree indirect relationships between members of the online social network based at least in part on first degree direct communication between members of the online social network; and providing an existing member of the online social network with at least a portion of the portal subscriber information if the online portal subscriber also becomes a registered member of the online social network, wherein the provided information is determined at least in part on at least a second degree indirect relationship between the subscriber and the existing member, wherein the at least second degree indirect relationship includes:

a first direct relationship between the subscriber and an intermediary member of the online social network, wherein the first direct relationship is established by at least one direct communication between the subscriber and the intermediary member; and a second direct relationship between the intermediary member and the existing member, wherein the second direct relationship is established by at least one direct communication between the intermediary member and the existing member, and wherein a direct relationship does not exist between the subscriber and the existing member prior to providing the provided information to the existing member.

33. The client device of claim 32, wherein the online social network enables multiple degrees of separation in relationships among members of the online social network.

34. The client device of claim 33, wherein the machine instructions further cause the processor to perform the operation of limiting access to the online social network if the portal subscriber information indicates that the online portal subscriber has engaged in spamming.

35. The client device of claim 33, wherein the machine instructions further cause the processor to perform at least one of the operations of:
creating a social network profile from at least the portion of the information;
creating a vertical profile from at least the portion of the information; and
mapping a portal profile to a social network profile.

36. The client device of claim 33, wherein the machine instructions further cause the processor to perform the operations of:
comparing the portal subscriber information to membership criteria of at least one social network activity, wherein the at least one social network activity comprises an online activity that is available to any member of the online social network; and
determining the at least one social network activity for which the portal subscriber information indicates a possible interest in participating, wherein a level of possible interest corresponds to a degree of matching between the portal subscriber information and the membership criteria of the at least one social network activity.

37. The client device of claim 33, wherein the machine instructions further cause the processor to perform the operation of enabling the online portal subscriber to select a public activity in which to participate.

38. The client device of claim 37, wherein the existing member of the online social network has expressed an interest in the public activity, and the machine instructions further cause the processor to perform the operation of making available to the existing member, a predefined subset of the portal subscriber information related to the public activity.

39. The client device of claim 33, wherein the machine instructions further cause the processor to perform the operation of enabling the online portal subscriber to create a subscriber-definable category of online social network members, each with a first degree relationship with the online portal subscriber through the online social network.

40. The client device of claim 39, wherein the machine instructions further cause the processor to perform the operation of:
inviting the existing member to join the subscriber-definable category; and
making available to the subscriber-definable category of online social network members, a selectable subset of the portal subscriber information.

41. The client device of claim 33, wherein the machine instructions further cause the processor to perform the operations of:
determining that the online portal subscriber has engaged in spamming behavior while interacting with the online social network; and
indicating to the online portal that the online portal subscriber has engaged in spamming behavior while interacting with the online social network.

42. The client device of claim 41, wherein the machine instructions further cause the processor to perform the operation of imposing a sanction on the online portal subscriber when the online portal subscriber attempts to interact with one of the online portal and the online social network.

43. The client device of claim 33, wherein the client device further comprises a mobile device.

44. An electronic data storage medium for accessing portal subscriber information in an online social network, the electronic data storage medium comprising instructions that enable a computing device to perform the actions of:
accessing portal subscriber information that includes a characteristic of an online portal subscriber registered with the online portal and wherein the portal subscriber information includes a portal assessment made by at least one of a plurality of other subscribers of the online portal about the online portal subscriber, and the portal subscriber's portal assessment information is based at least in part on an online-behavior of the online portal subscriber and at least a portion of the other subscribers of the online portal that make the portal assessment are separate from a plurality of members of the online social network, and, wherein the online behavior includes an online action by the online portal subscriber that is separate from and not performed by the subscriber while using the online social network, which is configured to determine multiple degree indirect relationships between members of the online social network based at least in part on first degree direct communication between members of the online social network; and
providing a member of the online social network with at least a portion of the portal subscriber information if the online portal subscriber also becomes a registered member of the online social network, wherein the provided information is determined at least in part on at least a second degree indirect relationship between the subscriber and the existing member, wherein the at least second degree indirect relationship includes:
a first direct relationship between the subscriber and an intermediary member of the online social network, wherein the first direct relationship is established by at least one direct communication between the subscriber and the intermediary member; and a second direct relationship between the intermediary member and the existing member, wherein the second direct relationship is established by at least one direct communication between the intermediary member and the existing member, and wherein a direct relationship does not exist between the subscriber and the existing member prior to providing the provided information to the existing member.

45. An apparatus for sharing, via at least one processor associated with the apparatus, a registered online portal subscriber's portal subscriber information in an online social network, comprising:

accessing, via the at least one processor, the registered portal subscriber's portal subscriber information, which includes a portal assessment made by at least one of a plurality of other registered subscribers of the online portal about the registered online portal subscriber, and the portal subscriber's portal assessment information is determined based on at least in part an online behavior of the registered online portal subscriber and at least a portion of the other registered subscribers of the online portal that make the portal assessment are separate from a plurality of members of the online social network, and, wherein the online behavior is separate from and not performed by the registered online portal subscriber while using the online social network, which is configured to determine multiple degree indirect relationships between members of the online social network based at least in part on first degree direct communication between members of the online social network; and     providing, via the at least one processor, a member of the online social network with at least a portion of the portal subscriber information if the registered online portal subscriber also becomes a registered member of the online social network, wherein the online social network enables more than first degree of separation in relationships among members of the online social network.

\* \* \* \* \*